US006882972B2

(12) United States Patent
Kompe et al.

(10) Patent No.: US 6,882,972 B2
(45) Date of Patent: Apr. 19, 2005

(54) METHOD FOR RECOGNIZING SPEECH TO AVOID OVER-ADAPTATION DURING ONLINE SPEAKER ADAPTATION

(75) Inventors: Ralf Kompe, Fellbach (DE); Silke Goronzy, Fellbach-Schmiden (DE); Krzysztof Marasek, Fellbach (DE)

(73) Assignee: Sony International (Europe) GmbH, Berlin (DE)

( * ) Notice: Subject to any disclaimer, the term of this patent is extended or adjusted under 35 U.S.C. 154(b) by 598 days.

(21) Appl. No.: 09/972,174

(22) Filed: Oct. 5, 2001

(65) Prior Publication Data

US 2002/0072894 A1 Jun. 13, 2002

(30) Foreign Application Priority Data

Oct. 10, 2000 (EP) .............................. 00122025

(51) Int. Cl.$^7$ .............................. G10L 15/20
(52) U.S. Cl. .................... 704/255; 704/251
(58) Field of Search .................. 704/251, 255

(56) References Cited

U.S. PATENT DOCUMENTS

| 5,617,486 A | | 4/1997 | Chow et al. | |
|---|---|---|---|---|
| 5,737,487 A | * | 4/1998 | Bellegarda et al. | 704/250 |
| 5,864,810 A | * | 1/1999 | Digalakis et al. | 704/255 |
| 6,389,393 B1 | * | 5/2002 | Gong | 704/244 |

FOREIGN PATENT DOCUMENTS

EP   1 008 983   6/2000

OTHER PUBLICATIONS

Martin E A et al: *"Dynamic Adaptation of Hidden Markov Models for Robust Isolated–Word Speech Recognition"*, CASSP 88: 1988 International Conference on Acoustics, Speech, and Signal Processing (CAT. No. 88CH2561–9), New York, NY, USA, Apr. 11–14, 1988, New York, NY USA, IEEE, USA, pp. 52–54, vol. 1, XP002160890.

Thelen E: *"Long Term On–Line Speaker Adaptation for Large Vocabulary Dictation"* Proceedings ICSLP 96. Fourth International Conference on Spoken Language Processing (CAT. No. 96TH8206), ICSLP '96, Philadelphia, PA, USA, Oct. 3–6, 1996, pp. 2139–2142, vol. 4, XP002160889.

* cited by examiner

*Primary Examiner*—Daniel Abebe
(74) *Attorney, Agent, or Firm*—Frommer Lawrence & Haug LLP; William S. Frommer

(57) ABSTRACT

To avoid an over-adaptation of a current acoustic model (CAM) to certain and frequently occuring words for speech phrases during on-line speaker adaptation of speech recognizers it is suggested to count adaptation numbers ($a_j$) for each of said speech phrases (SPj) as numbers of times in that a distinct speech phrase (SPj) has been used as a basis for adapting said current acoustic model (CAM) and further to make the strength of adaptation of the current acoustic model (CAM) on the basis of said distinct speech phrase (SPj) dependent on its specific adaptation number ($a_j$) so as to decrease the influence of frequent speech phrases (SPj) in the received speech flow on the adaptation process.

13 Claims, 2 Drawing Sheets

METHOD FOR RECOGNIZING SPEECH TO AVOID OVER-ADAPTATION DURING ONLINE SPEAKER ADAPTATION

BACKGROUND OF THE INVENTION

The present invention relates to a method for recognizing speech according to the preamble of claim 1, and in particular to a method for recognizing speech which avoids over-adaptation to certain words during online speaker adaptation.

Nowadays, methods and devices for automatic speech recognition have implemented a so-called online speaker adaptation process to make the methods and devices more flexible with respect to the large variability of possible speaking behaviour of the speakers.

In conventional methods for recognizing speech a current acoustic model is used for the process of recognition, in particular for a set of given speech phrases to be recognized within an incoming speech flow. The implemented current acoustic model contains information which is relevant for the recognition process per se, in particular for all potential speakers (speaker-independent recognition). To increase the recognition rate the acoustic models for recognizing speech are adapted during the recognition process based on at least a recognition result which is already obtained. Adaptation means to extract specific information which is necessary to focus on the particular voice characteristics of the current speaker. The process of adapting said current acoustic model is therefore based on an evaluation of speech phrase subunits which are contained in a speech phrase under process and/or recently recognized. Not only observed units but also unobserved units can be adapted. That means that the speech phrase subunit is evaluated with respect to the acoustical neighbourhood appearing in the evaluated utterance.

In applications of common methods and devices for recognizing speech it appears that based on the specific context in which the applied methods and devices have to work the speech input contains distinct speech phrases, words or sounds in certain contexts much more often than most other words. For example, in an application of a method for recognizing speech for a traffic information system phrases and words which are specific for distinct locations, ways to travel, means of transport, certain commands or the like occur much more often than other words in the vocabulary.

Conventional methods and devices for recognizing speech have the major drawback that they focus in the adapting process for the current acoustic model on each received speech phrase or word in an equivalent manner. Therefore, received speech phrases or words which do occur frequently influence the modification and adaptation on the current acoustic model much more than words or phrases which do occur infrequently.

As a result, after having applied conventional methods for adaptation these frequently occuring speech phrases or words are recognized with a very small error rate but the recognition rate for other vocabulary is worse.

SUMMARY OF THE INVENTION

It is an object of the present invention to provide a method for recognizing speech in which the influence of frequently occuring speech phrases or words within the received speech flow on the adaptation process with respect to the current acoustic model is balanced.

The object is achieved by a method for recognizing speech according to the generic part of claim 1 according to the invention with the features of the characterizing part of claim 1. Preferred and advantageous embodiments of the method for recognizing speech according to the invention are within the scope of the dependent subclaims.

The method for recognizing speech according to the invention is characterized in that adaptation numbers and/or occurrence numbers are counted for each of said speech phrases, words, subunits or the like as numbers of times that the particular speech phrase is used as a basis for adapting said current acoustic model or as numbers of times of recognized occurrences of said particular speech phrase in the received speech flow, respectively, and that in the process of adapting said current acoustic model the strength of adaptation on the basis of a given speech phrase is made dependent at least on its specific adaptation number and/or occurrence number, in particular so as to decrease the influence of frequent speech phrases in the received speech flow on the adaptation process.

It is therefore the basic idea of the present invention to distinguish the occuring speech phrases within the incoming speech flow by their frequency of occurrence and/or by their frequency of serving as a basis for the adaptation process of the current acoustic model. Therefore, according to the invention. occurrence numbers and/or adaptation numbers for each of the possible speech phrases to be recognized are counted.

As a further basic idea of the present invention in each adaptation step or process of the current acoustic model which is based in each case on a recognition result already obtained, i.e. on an occured and recognized speech phrase or the like, specific adaptation numbers and/or occurrence numbers of the distinct speech phrase under question for the adaptation step or process to be performed are concerned. The strength of adaptation with respect to a specific speech phrase in question is made dependent on at least the specific adaptation number and/or occurrence number of said specific speech phrase. The strength of adaptation can be understood as weight or weight factor which controls the influence of the analyzed speech phrase subunit and of the specific speech phrase on the current parameter estimation for the adaptation process of the current acoustic model.

The strength of adaptation and its dependence on the adaptation numbers and/or occurrence numbers is chosen in a way so as to decrease the influence of frequently occuring speech phrases in the received speech flow on the adatation process with respect to the current acoustic model.

In contrast to prior art methods and devices for recognizing speech, the method for recognizing speech according to the invention does not evaluate each occurrence of a specific speech phrase within the incoming speech flow in an equivalent way leading more or less to a proportionality between the frequency of the occuring speech phrase and the influence on the adaptation process, but the strength of adaptation for a given speech phrase is made frequency-dependent.

It is preferred that the current acoustic model is based on a set of model function mixtures. The adaptation process is then performed by transforming the functions, model function mixtures and/or the model function mixture components themselves and/or by changing at least in part the contributions of model function mixture components of model function mixtures. Therefore, an adaptation of the current acoustic model can be performed in an easy way by damping and/or increasing the influence of the distinct model function mixture components—i.e. their amplitudes or contributions—on the whole modelling character of each of said model function mixtures within said current acoustic model.

The incoming speech flow can be classified as a concatenation or combination of predetermined and well-defined acoustical entities. They may be called speech phrases or speech phrase subunits. According to a preferred embodiment of the inventive method for recognizing speech words, subword units, phones, phonemes, syllables, letters and/or the like and/or combinations or concatenations thereof are used as said speech phrases and/or as said speech phrase subunits of said current acoustic model. Choosing a state refinement of the incoming speech flow is a matter of convenience and practicability. Generally, the incoming speech flow can be classified as a concatenation of words or subword units, whereas the speech phrase subunits are based on a finer structure, for instance on the basis of phonemes, syllables or the like. In each case, the speech phrases are combinations and/or concatenations of said speech phrase subunits.

According to a further adavantageous embodiment of the inventive method for recognizing speech an adaptation of the current acoustic model is repeatedly performed in each case after given numbers of performed recognition steps and/or obtained recognition results. Further, an adaptation of said current acoustic model can be repeatedly performed in each case after given numbers of received and/or recognized speech phrases. This distinction describes cases where the numbers of recognition steps and recognition results do not coincide and/or cases where not all received speech phrases are recognized.

In a further preferred embodiment of the inventive method for recognizing speech an adaptation of said current acoustic model is repeatedly performed after each fixed and/or predetermined number of performed recognition steps. obtained recognition results and/or received/recognized speech phrases, in particular after each recognition step/result and/or received/recognized speech phrase.

Furtheron, the number of performed recognition steps, obtained recognition results and/or received or recognized speech phrases after which an adaptation of said current acoustic model is performed can be determined during the process of recognition and/or adaptation.

In accordance to the measures described above an adaptation of the current acoustic model is not necessarily performed after each step of recognition but an adaptation takes place after given numbers of recognition steps or recognition results obtained. The ruling numbers can be determined in an on-line process during recognition or adaptation. But they can also be set as predetermined values in advance of a recognition session and may vary dependently on the particular speech recognizing session.

A peculiar point is the determination of the adaptation numbers and/or the occurence numbers of the distinct speech phrases which may occur during the incoming speech flow. The simplest form of the inventive method is achieved by determining a fixed threshold number to compare each occurrence and/or each involvement in an adaptation process of said speech phrases and to then refrain from using a given speech phrase for another adaptation process in its specific adaptation number and/or occurrence number reaches and/or exceeds the given and fixed threshold number.

Additionally, the threshold number may be set for each of said speech phrases or for classes of them independently. They may be set as fixed and/or predetermined values or may also be varied and calculated within the process.

According to a further preferred embodiment for recognizing speech the counted adaptation numbers and/or occurrence numbers are not only counted from the very beginning of the recognition session but they are allowed to also be decreased and/or reduced during the continuation of the current recognition session. In particular, each distinct adaptation number and/or occurrence number of a given speech phrase may be reduced, decreased, decremented and/or reset to zero after a given elapsed period of time, a given total number of recognition results or steps, a given total number of adaptation steps, a given total number of received and/or recognized speech phrases or utterances, in particular since the last incrementation of said distinct adaptation number and/or occurrence number.

According to the measure described above, it is possible to vary the strength of adaptation, i.e. the influence on the adaptation process, of a given speech phrase both in a decreasing and in an increasing manner dependent on the frequency of its occurrence. If for example a given speech phrase occurs in a first period of recognition very often, its adaptation strength is reduced according to the invention so as to avoid over-adaptation with respect to that particular speech phrase. Then a second period of recognition may occur in which this distinct speech phrase is not contained and not received. If then in a third period of recognition said disctinct speech phrase again occurs the influence on the adaptation in accordance with such speech phrase is evaluated on a higher level compared to the first period of frequent occurrence of the speech phrase in question. According to the embodiment described above the adaptation strength and therefore the influence of a speech phrase on the adaptation process may recover in periods of the adaptation process having infrequent or no occurrences of the speech phrase in question.

According to a further preferred embodiment the adaptation strength with respect to each of said speech phrases and/or speech phrase subunits in the adaptation process of said current acoustic model is set to essentially decrease in particular strictly—monotonically with increasing adaptation numbers and/or occurrence numbers in each case, in particular in an essential inversely proportional manner. This enables the inventive method to give frequently occuring speech phrases a lower adaptation strength and therefore a lower influence on the adaptation process of said current acoustic model.

Additionally, to the dependence on the distinct occurrences and involvements in the adaptation process the adaptation strength of each of said speech phrases may be in accordance with another advantageous embodiment of the inventive method be set to be dependent on an elapsed period of time, a total number of received and/or recognized speech phrases within said incoming speech flow, a number of adaptations performed on said current acoustic model and/or the like.

In an appropriate embodiment of the inventive method for recognizing speech model function mixtures are used for said current acoustic model which at least contain distribution functions or the like, and in particular functions of the Gaussian type or the like.

The basic aspects of the present invention may further be summarized as follows:

Speaker adaptation methods for speech recognizing systems and methods transform an acoustic model in a way to better fit to the acoustic properties and speaking behaviour of a given and specific speaker. During an online adaptation process no enrollment phase in advance to the application of the system and the method is needed. An adaptation of the current acoustic model may take place after the receipt and/or recognition of every speech phrase and/or utterance or after a given number of them and in particular during the system and the method is online and in use.

In an application of such a system or method it might happen that a specific user—in particular in the beginning of a recognizing session—uses a particular speech phrase, word, utterance or a few of them very frequently compared to others. In such a case prior art adaptation methods would not only adapt the involved particular acoustic models or phoneme models to the speaker but also to the specific acoustic properties in the context of these frequently occuring words, phrases or utterances. As a result only these few words, phrases or utterances are well-recognized but other words, phrases or utterances are recognized worse, as the frequently occuring words, phrases or utterances have because of their frequent occurrence a higher influence on the prior art adaptation process. Therefore, prior art adaptation methods and conventional speech recognizing methods suffer from the problem of over-adaptation by frequently occuring words.

In an extreme, where e.g. the used models are clean models and the system is used in noisy environment, the involved acoustic models would be adapted not only to the speaker but also to the environment. As a result, these models would match in the majority of the case, because they better fit to the environmental conditions. So always these words would be recognized no matter what was said.

Speech recognizers involve statistical models in the acoustic models, in particular for the description of acoustic properties of the incoming speech. Word models are a concatenation of the corresponding refined models, for instance of corresponding phoneme models. The frame-wise acoustic properties are modelled within a current acoustic model by the evaluation of model function mixtures and in particular by a mixture of Gaussian distributions which are attached for example to the phoneme models, representing feature vectors extracted from the incoming speech signal. Usually, for each phoneme different models are used depending on the left and right phonemic or acoustical context. Accordingly, there exist several thousands or ten-thousands of models. To reduce the computational burden similar distribution functions or Gaussians of different phone models are merged and the resulting Gaussians or distribution functions are shared across the models. In online adaptation the modified acoustic model, and in particular their parameters can be weighted sums of the old parameters and the estimate of the current or current few utterances or speech phrases. If a user speaks a particular phrase or word repeatedly the speaker adaptation transforms the specific distribution or model function mixture, in particular Gaussians, in a way that they optimally fit to that particular phrase, utterance or word. Therefore, other words which do not occur frequently may be badly recognized after that particular adaptation of the current acoustic model, because the Gaussians were shared due to similar acoustic properties of the baseline system.

In a first example of an adaptation based on maximum likelihood linear regression (MLLR) one or a few transformation matrices are estimated on the speech of the single user to transform a large set of Gaussians. This procedure is done every few utterances. If the matrices are estimated only on utterances of the same word, then the transformation is not representative for all the Gaussians and most of them are transformed in the wrong way.

According to another example in which an adaptation is based on maximum a posteriori estimation (MAP) each Gaussian observed in the speech signal of an utterance is transformed individually. Since Gaussians are shared across phoneme models, adaptation only on the same word would cause the Gaussian to adapt to a specific context. The other contexts would not be represented anymore.

In accordance to the invention and the proposed method therein track is kept in which context a model function mixture and their components, in particular a distribution function or a Gaussian, was adapted. Several explicit solutions can be proposed.

In a particular simple solution one keeps track on which words or speech phrases or the like an adaptation takes place. If the same word, speech phrase or utterance occurs n times within the past m utterances, speech phrases, words or the like within the incoming speech flow, this utterance, speech phrase or word is not used for an adaptation of the current acoustical model anymore.

In a second solution the strength of adaptation—i.e. the weight which gives a control on the influence of said adaptation on the current parameter estimation—is e.g. inversely proportional or the like to the frequency of occurrence of said particular utterance, speech phrase or word within the incoming speech flow.

If a specific model function mixture component, in particular a Gaussian, is to be adapted and the statistics for the adaptation of said Gaussian were computed repeatedly in the past few utterances, speech phrases or words from the same, in particular context-dependent phone model, the above described first or second solutions are applied.

For example, assuming the speaker uttered in a row "Goethestrasse", "Stettener Strasse", "Hauptstrasse", then probably in the last utterance the model function mixture component, i.e. corresponding Gaussian, attached to the phone model of /a/ would not be adapted anymore, because it occured always in the same context "Strasse". In contrast the phone model for /t/ could still be adapted because it occured in different acoustical contexts "Goethe", "Stettener" and "Haupt".

In the following the method for recognizing speech according to the invention will be explained in more detail taking reference to a schematical drawing on the basis of preferred embodiments of the inventive method for recognizing speech.

DETAILED DESCRIPTION OF THE DRAWINGS

Figure 1:
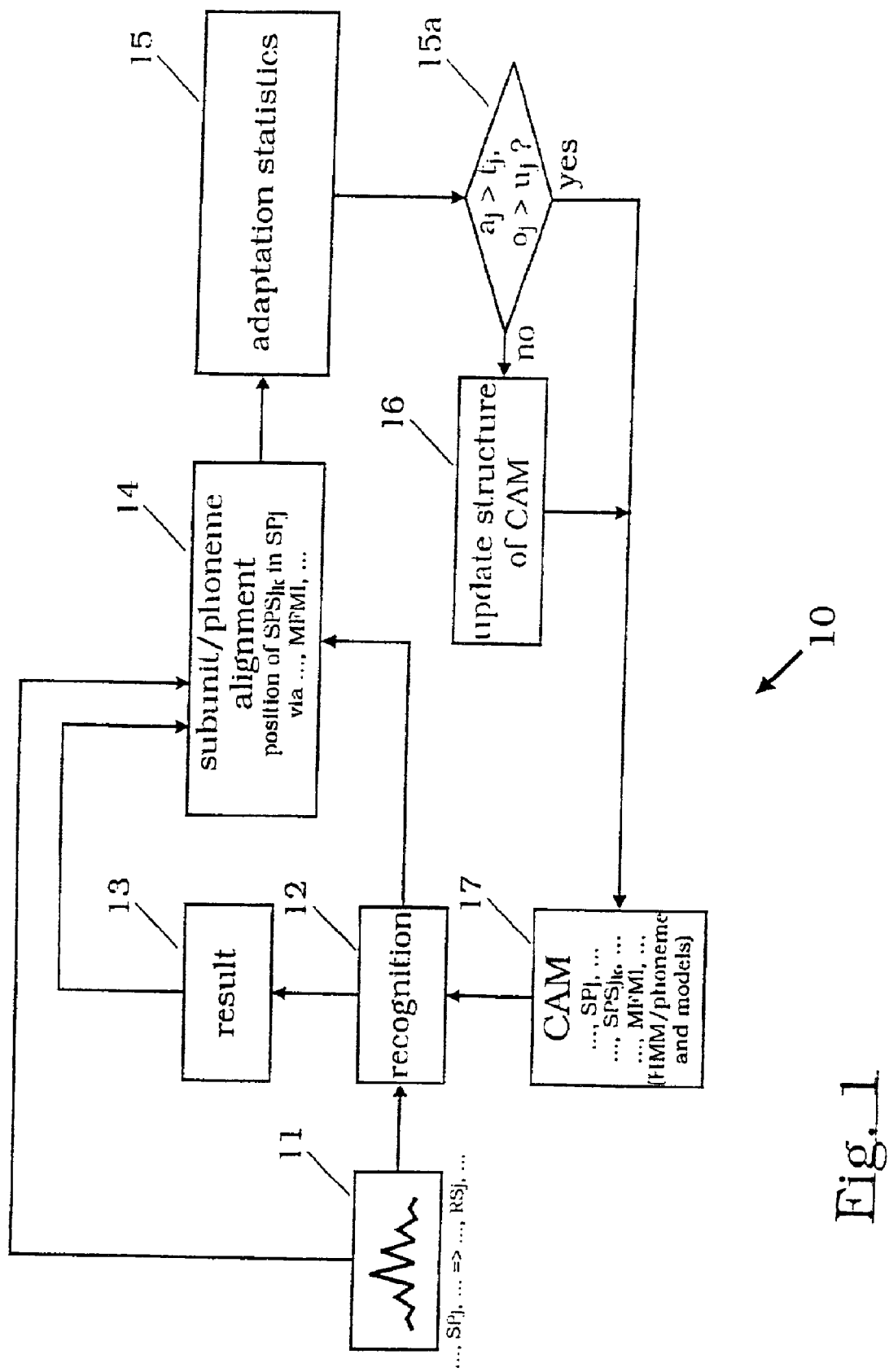
FIG. 1 is a schematical block diagram showing the fundamental steps of an embodiment of the inventive method for recognizing speech.

FIG. 1 shows by means of a schematical block diagram fundamental or basic steps of an embodiment for the inventive method for recognizing speech.

In first step 11 of the recognition and adaptation process 10 of FIG. 1 the incoming speech flow being built up as a concatenation of possible speech phrases . . . , SPj, . . . is received and preprocessed to a sequence of representing signals . . . , RSj, . . . . Then in step 12 recognition is performed in which a current acoustic model CAM describing acoustic properties on the basis of phoneme models, HMM models or the like being fed into the recognition process of step 12 by step 16 and leading to the recognition result of step 13.

In the following step 14 the incoming speech of step 11, the recognition result of step 13 and further information of the recognition process of step 12 is evaluated for obtaining alignment information with respect to the alignment of received and/or recognized speech phrases . . . , SPj, . . . speech phrase subunits . . . , $SPSj_k$, . . . phonemes or the like. On the basis of that particular alignment information adaptation statistic information is extracted in step 15 with respect to the adaptation and/or ocurrence numbers $a_j$, $o_j$ and then included into a modification of the current acoustic model CAM in steps 15a and 16 if the thresholds $t_j$ and $u_j$ for $a_j$ and $o_j$, respectively, are not exceeded, i.e. said information is only used for adaptation a limited number of times.

Figure 2:
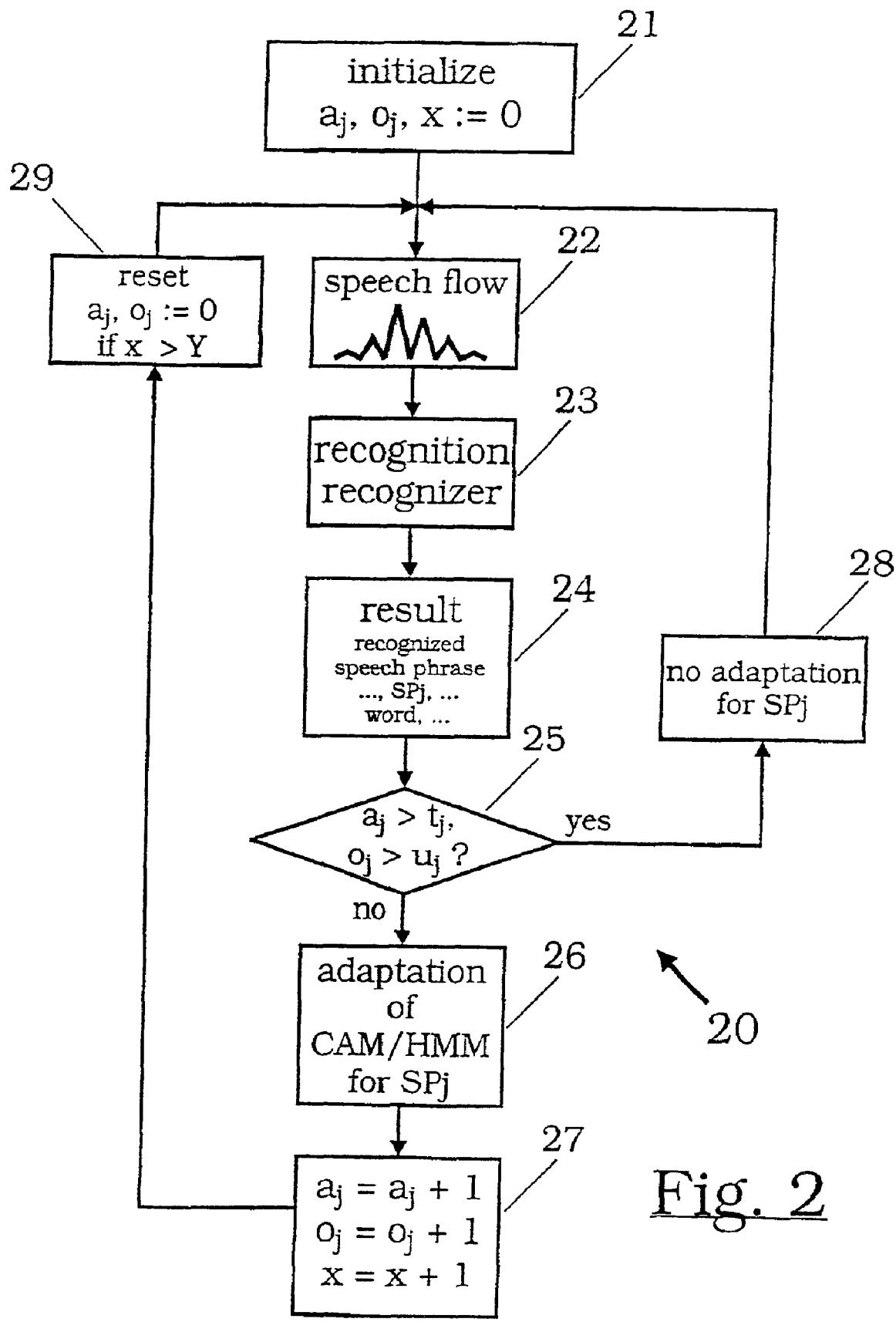
FIG. 2 is a schematical block diagram showing in more detail the embodiment of FIG. 1.

FIG. 2 shows in more detail the processing within the embodiment of FIG. 1 also by means of a schematical block diagram.

In the beginning or the start up phase for the embodiment of the inventive method or recognizing speech the method 20 is initialized by resetting all adaptation numbers for all speakers and all speech phrases or words to zero in step 21 of the processing 20 shown in FIG. 2.

In step 22 of FIG. 2 the incoming speech flow is received and preprocessed. Then the recognizing process is performed in step 23 leading to the recognized result in the form of a recognized speech phrase, word or the like in Step 24.

On the basis of the extracted adaptation statistics of step 15 in FIG. 1 it is determined on whether or not the specific occured and/or recognized speech phrase SPj, word or the like has been used for an adaptation of the current acoustic model CAM more than a given numbers $t_j$, $u_j$ of times before in step 25. If the number of involvements is lower than the given fixed thresholds $t_j$, $u_j$ the distinct speech phrase SPj, word or the like is used for an adaptation for the current acoustic model CAM, in particular on the basis of the phoneme models to modify the HMM model in step 26.

Finally, according to the involvement of the speech phrase SPj or word in question its specific adaptation number $a_j$ is incremented in step 27, and then the processing is returned back for receiving further speech flow in step 22.

In the case that the specific speech phrase SPj, word or utterance in question was involved more than $t_j$, $u_j$ times in an adaptation process for the current acoustic model CAM before the processing in step 25 is branched to step 28 in which the processing refrains from conducting an adaptation with respect to the distinct occured and/or recognized speech phrase, word or utterance or the like. From step 28 the processing returns to step 32 again to further receive incoming speech flow.

According to a further embodiment, it is advantageous to make the threshold values $t_j$ or $u_j$ (in FIGS. 1, 2) dependent on the overall or global number x of adaptation steps in a recognition session. Additionally or alternatively, $a_j$, $o_j$ can be resetted to zero if said overall adaptation x number is very large, e.g. larger than a given threshold Y, as shown in step 29. This measure considers the fact that after a large number x of adaptation steps it is not important to restrict the contribution of a certain word or phoneme compared to a case with low numbers of x.

In each case x has to be initialized and incremented as shown in steps 21 and 27, respectively.

What is claimed is:

1. Method for recognizing speech, wherein for the process of recognition—in particular for a set of speech phrases (SP1, . . . , SPN)—a current acoustic model (CAM) is used, wherein said current acoustic model (CAM) is adapted during the recognition process based on at least one recognition result already obtained, and wherein the process of adapting said current acoustic model (CAM) is based on an evaluation of speech phrase subunits ($SPSj_k$) being contained in a speech phrase (SPj) under process and/or recently recognized, characterized in that adaptation numbers ($a_j$) and/or occurrence numbers ($o_j$) are counted for each of said speech phrases (SP1, . . . , SPN) as numbers of times that a particular speech phrase (SPj) is used as a basis for adapting said current acoustic model (CAM) or as numbers of times of recognized occurrences of said particular speech phrase (SPj) in the received speech flow, respectively, and in the process of adapting said current acoustic model (CAM) the strength of adaption on the basis of a particular speech phrase (SPj) is made dependent on at least its specific adaptation number ($a_j$) and/or occurence number ($o_j$), in particular so as to decrease the influence of frequent speech phrases (SPj) in the received speech flow on the adaptation process.

2. Method according to claim 1, wherein the current acoustic model (CAM) is based on a set of model function mixtures (MFM1, . . . , MFMn) and wherein the adaptation process is at least in part performed by transforming the model function mixtures (MFMj) and/or the model function mxiture components ($MFMj_k$) and/or by changing at least in part contributions of model function mixture components ($MFMj_k$; mixture weights) of model funtion mixtures (MFMj).

3. Method according to claim 1, wherein words, subword units, phones, phonemes, syllables, letters and/or the like and/or combinations thereof are used as said speech phrases (SPj) and/or as said speech phrase subunits ($SPSj_k$) of said current acoustic model (CAM) and wherein in each case said speech phrases (SPj) are combinations or concatenations of said speech phrase subunits ($SPSj_k$).

4. Method according to claim 1, wherein an adaptation of said current acoustic model (CAM) is repeatedly performed after given numbers of performed recognition steps, obtained recognition results and/or received or recognized speech phrases (SPj).

5. Method according to claim 1, wherein an adaptation of said current acoustic model (CAM) is repeatedly performed after each fixed and/or predetermined number of performed recognition steps, obtained results and/or received or recognized speech phrases (SPj), in particular after each recognition step/ result and/or received/recognized speech phrase (SPj).

6. Method according to claim 1, wherein the number of performed recognition steps, obtained recognition results and/or received or recognized speech phrases (SPj) after which an adaptation of the current acoustic model (CAM) is performed is determined during the process of recognition or adaptation.

7. Method according to claim 1, wherein each adaptation number ($a_j$) and/or occurrence number ($o_j$) of a given speech phrase (SPj) is reduced, decreased, decremented and/or reset to zero after given elapsed periods of time, given total numbers of recognition steps, given total numbers of adaptation steps and/or given total numbers of received/recognized speech phrases or utterances, in particular with respect to a last incrementation of said distinct adaptation number ($a_j$) and/or occurrence number ($o_j$).

8. Method according to claim 1,
wherein the adaptation strength with respect to each of said speech phrases (SPj) and/or speech phrase subunits ($SPSj_k$) during the adaptation process of said current acoustic model (CAM) is set to essentially decrease—in particular strictly—monotonically with increasing adaptation numbers ($a_j$) and/or occurrence numbers ($o_j$) in each case, in particular in an essentially inversely proportional manner.

9. Method according to claim 1,
wherein the adaptation strength is set to be dependent on an elapsed period of time, a total number of received and/or recognized speech phrases (SPj), a total number of adaptations performed on said current acoustic model (CAM) and/or the like.

10. Method according to claim 1,
wherein the adaptation strength for a distinct speech phrase (SPj) is decreased and/or set to zero if the assigned adaptation number ($a_j$) and/or occurrence number ($o_j$) exceeds a given threshold number ($t_j$).

11. Method according to claim 10,
wherein the threshold number ($t_j$) is set for each of said speech phrases (SPj) independently.

12. Method according to claim 10,
wherein said threshold numbers ($t_j$) are predetermined, fixed and/or changed and varied during the processes of recognition and/or of adaptation.

13. Method according to claim 1,
wherein model function mixtures (MFMj) are used for said current acoustic model (CAM) which are based on distribution functions or the like, in particular functions of the Gaussian type or the like.

* * * * *